US009111323B2

(12) United States Patent
Freeman

(10) Patent No.: US 9,111,323 B2
(45) Date of Patent: Aug. 18, 2015

(54) METHODS FOR PREDICTIVE CONSUMER ITEM ORDERING AND DEVICES THEREOF

(75) Inventor: William Freeman, San Anselmo, CA (US)

(73) Assignee: Layers, LLC, San Francisco, CA (US)

( * ) Notice: Subject to any disclaimer, the term of this patent is extended or adjusted under 35 U.S.C. 154(b) by 0 days.

(21) Appl. No.: 13/364,414

(22) Filed: Feb. 2, 2012

(65) Prior Publication Data

US 2013/0204718 A1 Aug. 8, 2013

(51) Int. Cl.
*G06Q 50/12* (2012.01)
*G06Q 10/08* (2012.01)
*G06Q 20/20* (2012.01)
*G06Q 30/02* (2012.01)
*G06Q 30/00* (2012.01)

(52) U.S. Cl.
CPC ............ *G06Q 50/12* (2013.01); *G06Q 10/087* (2013.01); *G06Q 20/20* (2013.01); *G06Q 30/00* (2013.01); *G06Q 30/0202* (2013.01)

(58) Field of Classification Search
CPC ..... G06Q 50/12; G06Q 10/087; G06Q 20/20; G06Q 30/0202
See application file for complete search history.

(56) References Cited

U.S. PATENT DOCUMENTS

| 6,026,372 A * | 2/2000 | Savage ............................ 705/15 |
| 6,842,719 B1 | 1/2005 | Fitzpatrick et al. |
| 7,324,958 B2 * | 1/2008 | Miyazaki et al. ................ 705/15 |
| 2003/0139937 A1 * | 7/2003 | Lee .................................... 705/1 |
| 2006/0010037 A1 | 1/2006 | Angert et al. |
| 2006/0218039 A1 | 9/2006 | Johnson |
| 2009/0265216 A1 | 10/2009 | Flynn et al. |
| 2010/0121722 A1 | 5/2010 | Vawter |

FOREIGN PATENT DOCUMENTS

JP 2004199168 A 7/2004

OTHER PUBLICATIONS

Masaki et al., "System for Supporting Order Reception and Cooking Preperation for Food and Drink Industry," Jul. 15, 2004, JP 2004-1991168 A), Machine Translation of the Detalied Description as provided by the JPO.*

* cited by examiner

*Primary Examiner* — Asfand Sheikh
(74) *Attorney, Agent, or Firm* — LeClairRyan, a Professional Corporation

(57) ABSTRACT

A method, non-transitory computer readable medium, and apparatus that generates preorder information identifying a plurality of consumer items to be prepared at designated begin times, based at least in part on historical purchase information. At each of the designated begin times a ticket is generated identifying a consumer item, wherein the consumer item has an associated duration such that the consumer item will be ready at a finished time. Each ticket is provided to a client computing device, wherein the tickets further include at least a remaining amount of time until the identified consumer item reaches the finished time. A request is received from the client computing device to claim one of the consumer items identified by one of the provided tickets. Each of the claimed consumer items is associated with a claimed status. The historical purchase information is updated based on the request.

24 Claims, 2 Drawing Sheets

METHODS FOR PREDICTIVE CONSUMER ITEM ORDERING AND DEVICES THEREOF

FIELD

This technology generally relates to predictive ordering of consumer items and, more particularly, to methods and devices for preordering consumer items, based at least in part on historical purchase information to reduce customer wait time, and providing information regarding the consumer items in progress to potential customers for claiming and eventual purchase to further reduce customer wait time.

BACKGROUND

Customers are often time-sensitive and typically desire to wait a minimal amount of time for consumer items requiring preparation, such as food, floral arrangements, pharmaceuticals and other items, while expecting no sacrifice to the quality of their items. Additionally, businesses, such as restaurants, generally benefit from decreased customer wait time, and increased table turns. Therefore, reduced wait time is beneficial to the customers, because they are generally more satisfied and likely to return due to the relatively small amount of time they have to wait for their items. Reduced wait time is also beneficial to the restaurant owner, allowing higher volumes of customers that can be serviced. However, reduced wait time is often difficult to achieve, particularly with respect to items that require a relatively long period of time to prepare.

One such example is a deep dish pizza, which often can take as long as forty minutes or more to prepare and cook. With respect to a restaurant having a menu including a variety of deep dish pizzas, for example, customers will often have to wait a relatively long period of time to receive their meals after ordering.

What is needed is a predictive ordering system configured to reduce customer wait time by utilizing logic to preorder consumer items based at least in part on aggregate historical purchase information as well as display information regarding these in-progress items to potential customers for claiming and eventual purchase.

SUMMARY

A method for predictive consumer item ordering includes generating, with a predictive ordering server apparatus, preorder information identifying a plurality of consumer items to be prepared at designated begin times prior to being ordered by a customer, wherein the plurality of consumer items are identified by the preorder information based at least in part on historical purchase information. At each of the designated begin times a ticket is generated with the predictive ordering server apparatus identifying at least one of the plurality of consumer items to be prepared based on the preorder information, wherein the consumer item has an associated duration such that the consumer item will be ready at a finished time. Each ticket is provided with the predictive ordering server apparatus to a client computing device, wherein the tickets further includes at least a remaining amount of time until the identified consumer item reaches the finished time. A request is received with the predictive ordering server apparatus from the client computing device to claim one of the consumer items identified by one of the provided tickets. Each of the claimed consumer items is associated with the predictive ordering server apparatus with a claimed status. The historical purchase information is updated with the predictive ordering server apparatus based on the request.

A computer readable medium having stored thereon instructions for predictive consumer item ordering comprising machine executable code which when executed by a processor, causes the processor to perform steps including generating preorder information identifying a plurality of consumer items to be prepared at designated begin times prior to being ordered by a customer, wherein the plurality of consumer items are identified by the preorder information based at least in part on historical purchase information. At each of the designated begin times a ticket is generated identifying at least one of the plurality of consumer items to be prepared based on the preorder information, wherein the consumer item has an associated duration such that the consumer item will be ready at a finished time. Each ticket is provided to a client computing device, wherein the tickets further include at least a remaining amount of time until the identified consumer item reaches the finished time. A request is received from the client computing device to claim one of the consumer items identified by one of the provided tickets. Each of the claimed consumer items is associated with a claimed status. The historical purchase information is updated based on the request.

A predictive ordering server apparatus includes a memory coupled to a processor configured to execute programmed instructions stored in the memory including generating preorder information identifying a plurality of consumer items to be prepared at designated begin times prior to being ordered by a customer, wherein the plurality of consumer items are identified by the preorder information based at least in part on historical purchase information. At each of the designated begin times a ticket is generated identifying at least one of the plurality of consumer items to be prepared based on the preorder information, wherein the consumer item has an associated cooking duration such that the consumer item will be ready at a finished time. Each ticket is provided to a client computing device, wherein the tickets further includes at least a remaining amount of time until the identified consumer item reaches the finished time. A request is received from the client computing device to claim one of the consumer items identified by one of the provided tickets. Each of the claimed consumer items is associated with a claimed status. The historical purchase information is updated based on the request.

This technology provides a number of advantages including methods, non-transitory computer readable medium, and apparatus that utilize logic to predict customer orders for consumer items, based at least in part on historical purchase information, and generate tickets identifying a consumer item and including a designated begin time at which the identified menu item is to be prepared and a duration associated with the identified consumer item. At the designated begin time, each ticket is sent to staff to begin the preparation process for the identified consumer item. The ticket can be stored in a tracking database on a predictive ordering database and/or server apparatus.

The system is able to interface with one or more web or non-web software applications to allow customers to communicate with the predictive ordering server apparatus. In particular, the customers may be allowed to view information regarding the tickets stored in the tracking database, determine how much time is remaining until the consumer item identified by each of the tickets is ready, and provide a means to allow the customer to claim and purchase an in-progress consumer item before or after the consumer item is ready. As a result, items are effectively preordered based on predictive logic and can be claimed by customers willing to purchase a consumer item in progress rather than wait the relatively longer period of time required to traditionally place and service an order.

DETAILED DESCRIPTION

In general, the present technology provides a number of advantages including methods, non-transitory computer readable medium, and apparatus that predict customer orders for consumer items and provide a platform for customers to claim consumer items currently being prepared, thereby reducing customer wait time and increasing customer volume and associated revenue.

Figure 1:
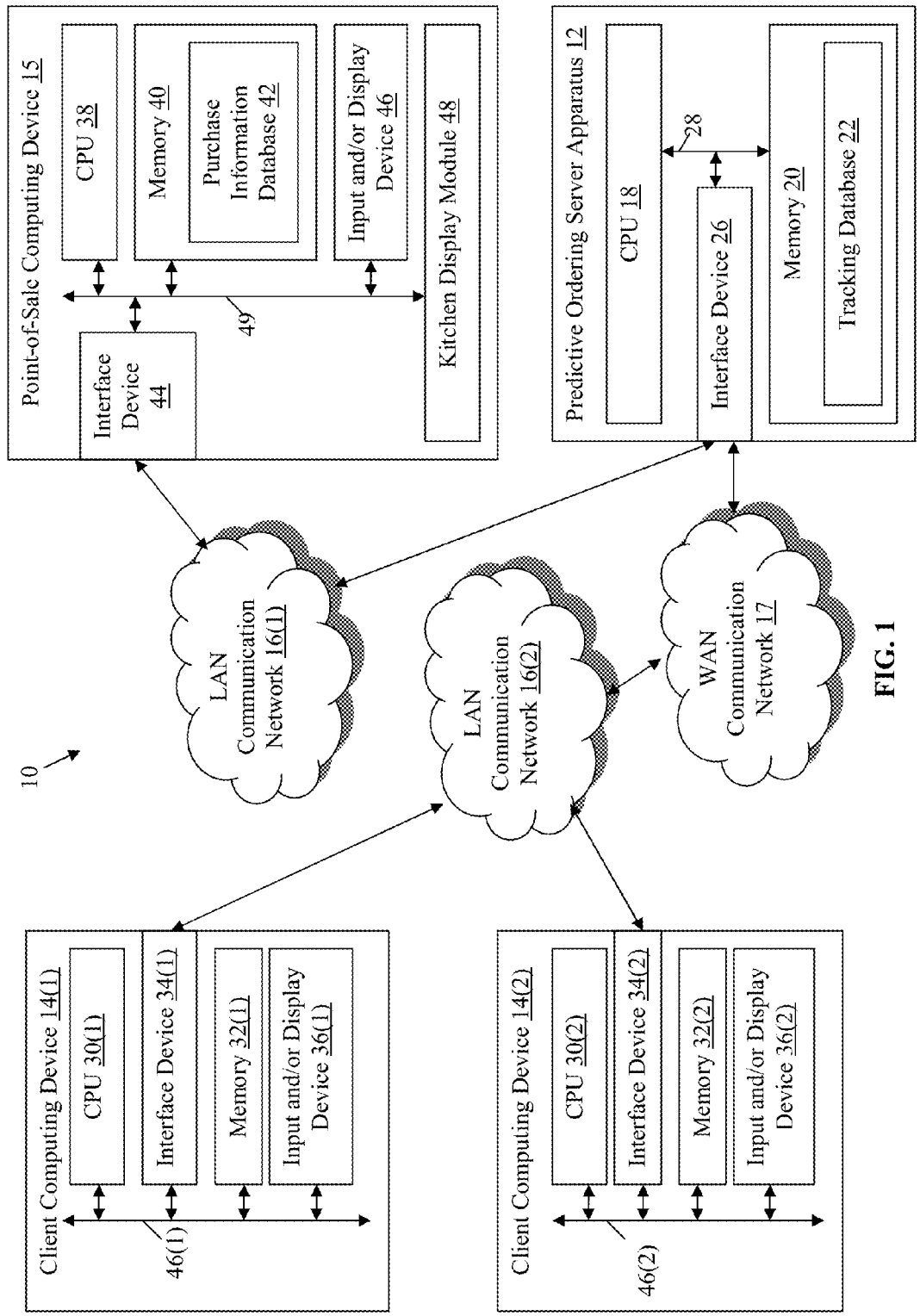
FIG. 1 is a block diagram of a network environment which incorporates an exemplary predictive ordering server apparatus for predictive consumer item ordering in accordance with an aspect of the present disclosure.

FIG. 1 is a block diagram of a network environment which incorporates an exemplary predictive ordering server apparatus 12 for predictive consumer item ordering in accordance with an aspect of the present disclosure. In particular, the environment 10 includes one or more predictive ordering server apparatus 12, one or more client computing devices 14(1)-14(2), and one or more point-of-sale computing devices 15. These devices are coupled together by one or more local area communication networks (LANs) 16(1)-16(2) and wide area communication network (WAN) 17, although other types and numbers of devices, components, topologies, configurations, and elements could be used. It is to be understood that the devices and systems of the examples described herein are for exemplary purposes, as many variations of the specific hardware and software used to implement the examples are possible, as will be appreciated by those skilled in the relevant art(s). Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

The predictive ordering server apparatus 12 may be a web, application, and/or database server including a central processing unit (CPU) or processor 18, a memory 20 including a tracking database 22, and an interface device 26, which are coupled together by a bus 28 or other link, although other numbers and types of systems, devices, components, and elements in other configurations and locations can be used. In an example, the bus 28 is a hyper-transport bus in this example, although other bus types and links may be used, such as PCI. In this example the predictive ordering server apparatus 12 may be any version of a Microsoft® IIS server or Apache® server, although other types of servers may be used. Although the predictive ordering server apparatus 12 is shown as one network component, it is contemplated that the apparatus 12 may be implemented among multiple servers in a virtual cloud computing environment including at least one predictive ordering system server and at least one web application server, for example.

Generally, the predictive ordering server apparatus 12 processes requests received from requesting client computing devices 14(1)-14(2) and point-of-sale computing device 15 via LANs 16(1)-16(2) and/or WANs 17 according to the HTTP-based application RFC protocol, but the principles discussed herein are not limited to this example and can include other application protocols. For example, LANs 16(1)-16(2) each may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), any other encrypted data network, combinations thereof, and the like.

The predictive ordering server apparatus 12 is further coupled to the client computing devices 14(1)-14(2) via WAN 17, which may comprise any wide area network (e.g., Internet), although any other type of traffic network topology may be used. Various network processing applications, such as CIFS applications, NFS applications, HTTP Web Server applications, and/or FTP applications, may be operating on the predictive ordering server apparatus 12 and transmitting data (e.g., files, Web pages) in response to requests for content from client computing devices 14(1)-14(2).

The processor or CPU 18 of the apparatus 12 may comprise one or more central processing units (CPUs) or general purpose processors with one or more processing cores, such as AMD® processor(s), although other types of processor(s) could be used (e.g., Intel®). The processor 18 in the predictive ordering server apparatus 12 may execute a program of stored instructions for one or more aspects of the present technology as described and illustrated by way of the examples herein.

The memory 20 in the ordering server apparatus 12 may store these programmed instructions for one or more aspects of the present technology as described and illustrated herein, although some or all of the programmed instructions could be stored and executed elsewhere. Additionally, the examples may also be embodied as a non-transitory computer readable medium having instructions stored thereon for one or more aspects of the technology, which when executed by the processor 18, cause the processor 18 to carry out the steps necessary to implement the methods of the examples, as described and illustrated herein.

A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

Figure 2:
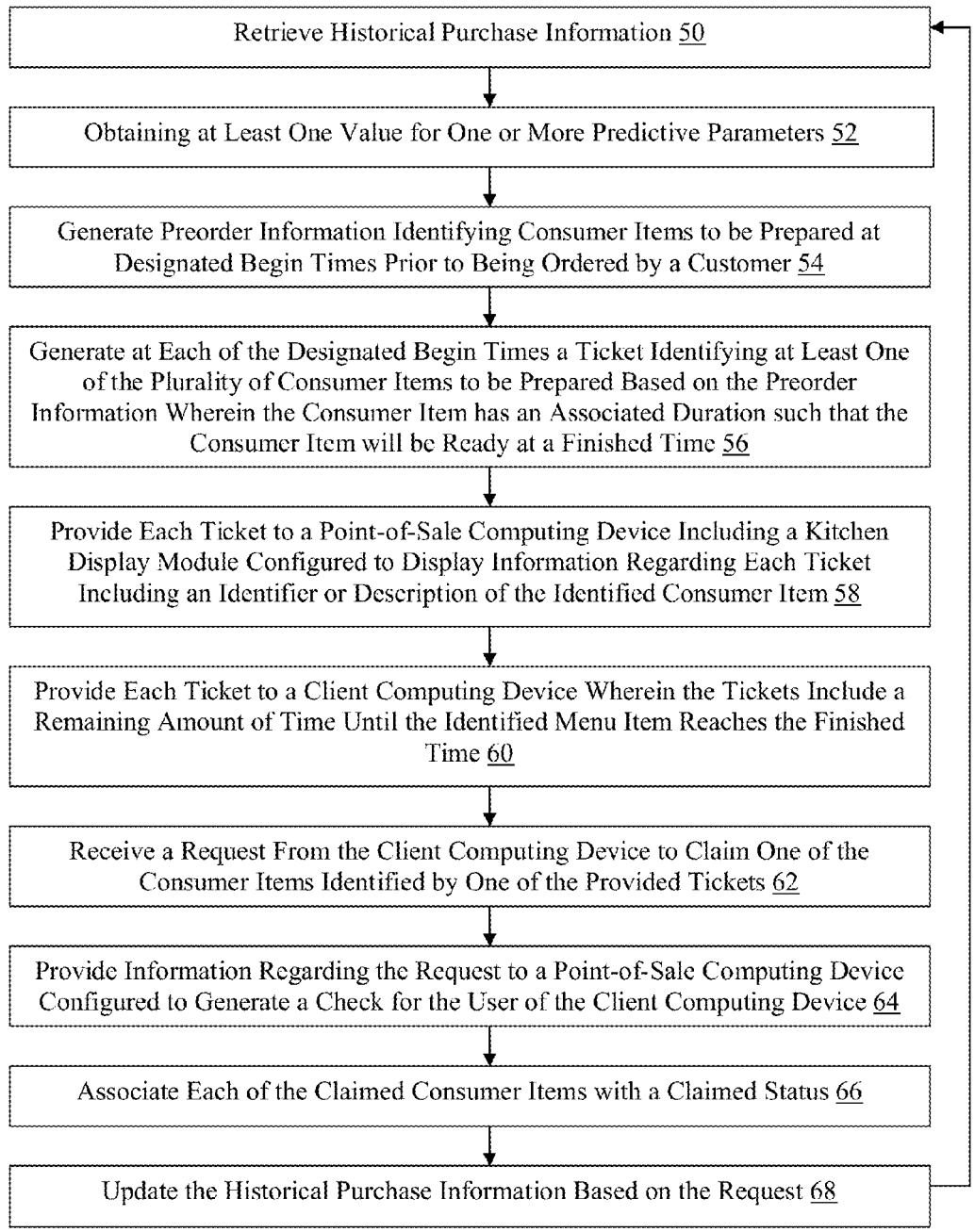
FIG. 2 is a flow chart of an exemplary method for predictive consumer item ordering in accordance with an aspect of the present disclosure.

In some examples, memory 20 includes a database management system (DBMS) configured to established, manage, and/or communicate with tracking database 22 stored in memory 20, such as an MS SQL server database, for example. The memory 20 can further include program instructions configured to communicate with the point-of-sale computing device 15 through the interface device 26. The flow chart shown in FIG. 2 is representative of example steps or actions of this technology that may be embodied or expressed as one or more non-transitory computer or machine readable instructions stored in the memory 20 that may be executed by the processor 18.

The interface device 26 of the predictive ordering server apparatus 12 may be used to operatively couple and communicate between the predictive ordering server apparatus 12 and the client computing devices 14(1)-14(2) and point-of-sale computing device 15, via LANs 16(1)-16(2) and WAN 17. By way of example only, the LANs 16(1)-16(2) and WAN 17 can use TCP/IP over Ethernet and industry-standard protocols, including NFS, CIFS, SOAP, XML, LDAP, and SNMP, although other types and numbers of communication networks can be used.

Each of the client computing devices 14(1)-14(2) includes a CPU or processor 30(1)-30(2), a memory 32(1)-32(2), an interface device 34(1)-34(2), and an input and/or display device 36(2), which are coupled together by a bus 46(1)-46(2) or other link, although other numbers and types of network devices could be used. Input and/or display device 36(1)-36(2) enable a user to interact with the client computing device 14(1)-14(2), such as to input and/or view data. Input devices may include a keyboard and/or a computer mouse and display devices may include a computer monitor and/or a capacitive touchscreen, although other types and numbers of input devices and display devices could be used. The client computing devices 14(1)-14(2), in this example, may run interface applications, such as web browsers, that may provide an interface to make requests for and send content and/or data to the predictive ordering server apparatus 12 via the LAN 16(2) and/or WAN 17.

The point-of-sale computing device 15 includes a CPU or processor 38, a memory 40 including a purchase information database 42, an interface device 44, an input and/or display device 46, and a kitchen display module 48, which are coupled together by a bus 49 or other link, although other numbers and types of systems, devices, components, and elements in other configurations and locations can be used. In an aspect, the point-of-sale computing device 15 can be located on premises and the memory 40 can include program instructions for facilitating customer purchases of consumer items, communicating purchase information to the predictive ordering server apparatus 12, receiving customer purchase information for consumer items claimed using the predictive ordering server apparatus 12, displaying information to restaurant staff regarding preordered and/or ordered consumer items requiring preparation, and the like.

In an aspect in which the consumer items are food menu items, the point-of-sale computing device 15 can include a kitchen display module 48 configured to communicate generated tickets and/or other instructions to restaurant staff regarding which menu items are to be prepared and cooked, such as through input and/or display device 44. In an aspect, the kitchen display module can be a separate computing device, such as a client device 14 configured to communicate with the point-of-sale computing device 15 over a communication network using interface device 42.

An exemplary method for predictive consumer item ordering will now be described with reference to FIGS. 1 and 2. In this particular example, the consumer items are menu items offered by a restaurant but it should be appreciated that the consumer item can be any consumer item requiring preparation including floral arrangement, pharmaceuticals, mixed drinks, or any other consumer item. In this example, the point-of-sale computing device 15 processes and stores past customer purchases of menu items at the restaurant premises, over the phone and/or over the Internet. Accordingly, the point-of-sale computing device 15 receives customer purchase information for menu items including at least the time and date of the purchase, quantity of the menu item(s) purchased, and an identification and/or description of the purchased menu item(s). Additionally, the point-of-sale computing device 15 can generate checks or bills for the menu items and receive customer payments. If consented to by the customer, some or all of the customer purchase information as well as the customer's personal information, including customer preferences that can be compared against and matched with items in process of preparation that could be suggested to and/or claimed by the customer, can be stored in the purchase information database 42 in memory 40 and/or communicated in real-time to the predictive ordering server apparatus 12. As will be discussed, the stored historical purchase information is processed by the predictive ordering server apparatus 12 to predict future menu items to prepare and cook.

At step 50, the predictive ordering server apparatus 12 retrieves aggregate historical purchase information for a relevant population. In one example, the historical purchase information can be stored in the purchase information database 42 in memory 40 of the point-of-sale computing device 15 and periodically retrieved by the predictive ordering server apparatus 12 on a polling schedule. In other examples, the point-of-sale computing device 15 communicates customer purchase information in real-time, using the interface device 42 and LAN 16(1), to the predictive ordering server apparatus 12. Optionally, the predictive ordering server apparatus 12 stores the historical purchase information in memory 20.

In one example, the predictive ordering server apparatus 12 can retrieve historical information as stored in the purchase information database 42 for the prior two weeks, for example. In other examples, if the current day of the week is a Tuesday, historical purchase information can be obtained by the predictive ordering server apparatus 12 for the prior ten Tuesdays and/or the current day of the month for the prior four years, and/or for any other time period so as to provide sufficient data from which to predict future menu item orders. In some examples, the historical purchase information includes at least an identification and/or description of the menu item and the date and time the menu item was purchased.

Optionally, at step 52, the predictive ordering server apparatus 12 obtains at least one value for one or more predictive parameters such as restaurant location, weather, promotions, holidays, customer recommendations, aggressiveness, and/or special events, or any other parameter possibly affecting the number and/or type of menu items likely to be ordered. For example, in restaurant locations receiving a substantial number of customers by way of foot traffic, predicted adverse weather conditions for a specified day may be a predictive parameter which indicates an anticipated lower or higher volume of menu items may be purchased on that day. In one example, the values for the predictive parameters can be obtained from the point-of-sale computing device 15 based on user input through the input and/or display device 44 and communication of the values over LAN 16(1) to the interface device 26 of the predictive ordering server apparatus 12. In another example, the values for the predictive parameters are obtained automatically from a network accessible feed and/or an Internet web page.

Accordingly, in an example in which a weather predictive parameter is utilized, a user can input to the point-of-sale computing device that it is currently snowing and a string value for the weather parameter can be communicated to the predictive ordering server apparatus 12 to be used as described in detail below. Alternatively, the predictive ordering server apparatus 12 can be configured to automatically obtain at specified times a value for the weather predictive parameter from an Internet location, such as a weather forecast provider.

In another example, a value for an aggressiveness factor can be obtained by the predictive ordering server apparatus to allow the predictive logic to be more or less conservative with respect to predicted orders. Accordingly, the aggressiveness factor can be modified based on empirical analysis of the volume of predicted and prepared menu items that were not claimed by customers, for example.

It should be appreciated that one or more point-of-sale computing devices 15 can be located at a different restaurant location, for example. In such an environment, the predictive ordering server apparatus 12 and/or the predictive ordering server apparatus 12 can be configured to store the customer purchase information and/or the predictive parameter values as associated with a unique identifier associated with each restaurant location. In such environments, the relevant population associated with the aggregate historical purchase information can be associated with purchases originating from customers at a specified restaurant location.

At step 54, the predictive ordering server apparatus 12 generates preorder information identifying a plurality of menu items to be prepared and cooked at designated begin times prior to being ordered by a customer. In one example, the predictive ordering server apparatus 12 interprets the historical purchase information retrieved in step 50, and optionally interprets the predictive parameter values obtained at step 52 to generate one or more tickets having preorder information.

As stated, the preorder information is generated by the predictive ordering server apparatus 12 based on the historical purchase information and/or one or more predictive parameter values, each of which is optionally associated with an additive or reductive weight value. In an aspect, a promotion parameter can be weighted heavily indicating that the preorder information should include an increased number of menu items, when that parameter value indicates a promotion is currently in effect, and despite another parameter value having less weight indicating the volume of menu items may be reduced for the specified time period(s).

In an aspect the additive or reductive weight values can be determined by the predictive ordering server apparatus 12 based on an analysis of the effect of the predictive parameter value on historical purchase information for a relevant time period. The predictive parameter values for a certain time period can be associated with historical purchase information for a corresponding time period such that the effect of the predictive parameter value, and associated weight value, can be at least partially determined based on a comparison of historical purchase information sharing one or more attributes (e.g. same day of the year) but not sharing one or more attributes corresponding to a predictive parameter value (e.g. inclement weather).

Accordingly, in one example, a restaurant location may be more likely to receive more customers based on foot traffic during inclement weather, as compared to an average weather condition, whereas sales may be more likely to decrease at another location during inclement weather. Accordingly, the predictive ordering server apparatus 12 optionally stores predictive parameter values associated with relevant historical purchase information and compares historical purchase information for a plurality of relevant time periods to determine the predictive parameter weight values to be applied to the predictive parameter values optionally obtained in step 52. Additionally, the additive weight values can change over time based on increased data points regarding the effects of the conditions associated with one or more of the predictive parameters.

The preorder information generated at step 54 identifies one or more menu items to be prepared and cooked, each of which is associated with a begin time designated by the predictive ordering server apparatus 12. Such a level of granularity can result in fewer menu items being cooked and prepared prior or subsequent to the customer demand. The predictive ordering server apparatus 12 can generate the preorder information daily, weekly, in real-time, or based on any other time period. Additionally, the preorder information can include always available menu items such that one or more menu items are always available to be claimed by a customer as described in more detail below. In an aspect, the always available menu items can be included by the predictive ordering server apparatus 12 in the preorder information for a certain time period such as a peak portion of each day.

At step 56, the predictive ordering server apparatus 12 generates, at each of the designated begin times, one or more tickets, each identifying at least one of the plurality of menu items to be prepared and cooked based on the preorder information. Accordingly, based on the designated begin times associated with each menu item identified in the preorder information, the predictive ordering server apparatus 12 generates one or more tickets as described in detail below. Optionally, the predictive ordering server apparatus 12 communicates with the point-of-sale computing device 15 to compare the preorder information to current menu item orders to determine whether there is anticipated additional demand. If so, the preorder information can be modified to include only those menu items for which additional demand is predicted. In some examples, each menu item identified by a ticket has an associated duration such that the menu item will be cooked and ready at a finished time equal to the designated begin time plus the duration. The duration value for each menu item can be stored in memory 20 as associated with each menu item and/or in memory 40 as input by a user of the point-of-sale computing device 15 through the input and/or display device 44. It should be appreciated that menu items having any duration can be identified by a ticket.

Upon generating a ticket, the predictive ordering server apparatus 12 stores the ticket in the tracking database 22. In an aspect, the stored ticket for the menu item initially has a status value indicating that the identified menu item is unclaimed, along with other information including, but not limited to, the designated begin time for the menu item, a preparation/cooking duration time and/or the calculated finish time for the menu item. The ticket may contain other information such as the location of the restaurant where the menu item is being prepared, whether the menu item will be displayed on a client device 14 and the like.

At step 58, the predictive ordering server apparatus 12 provides each ticket to the point-of-sale computing device 15, whereby the tickets are communicated to the appropriate restaurant staff to begin preparing and cooking the menu items identified on each ticket at the designated begin times. In an aspect, the tickets are communicated to the staff by being automatically printed on paper at a printing device. Optionally, the ticket and associated relevant information are displayed to the restaurant staff via one or more kitchen display modules 48. In other examples in which the consumer items are not menu items, any other type of personal display module can be utilized to provide ticket information to staff.

At step 60, in an aspect, the predictive ordering server apparatus 12 can provide information associated with one or more generated tickets to be displayed on one or more of the client computing devices 14(1)-14(2). Accordingly, in one example, the predictive ordering server apparatus 12 can obtain a request from one of the client computing devices 14(1)-14(2) to view existing and/or future tickets via a web page and communicate with the tracking database 22 to retrieve at least a portion of the tickets requested. The predictive ordering server apparatus 12 can provide a user with information regarding one or more menu items currently in progress at the restaurant along with time remaining, if any, until the menu items are ready for serving.

In another example, the predictive ordering server apparatus 12 provides each ticket to one or more of the client computing devices 14(1)-14(2) by selectively sending an automatic notification to one or more customers based on customer profile information stored in the memory 20. In this example, users of one or more of the client computing devices 14(1)-14(2) can register with the predictive ordering server apparatus 12 through a registration web page configured to obtain customer profile information and store the information in the memory 20. The customer profile information can include customer contact information, customer menu item preference information, and/or customer notification preference information.

For example, a customer can access the predictive ordering server apparatus 12 and submit an electronic mail address, indicate a preference of receiving notifications by electronic mail, submit a menu item preference (e.g. a Chicago stuffed deep dish pizza having certain toppings), and submit a notification preference indicating a certain day of the week. In this example, the predictive ordering server apparatus 12 can compare the menu items identified by each ticket in the tracking database 22 to the plurality of customer menu item preferences stored in the memory 20, as well as the day of the week. If there is a match, the predictive ordering server apparatus 12 automatically sends an electronic mail notification to the customer's electronic mail address indicating that the customer's preferred menu item is currently being prepared at the restaurant. The notification electronic mail can optionally include a link to a Web page displaying the associated ticket. Other customer profile information can be provided and other preference information, such as requesting notifications based on geographic location, are possible.

At step 62, the predictive ordering server apparatus 12 receives a request from the one or more client computing devices 14(1)-14(2) to claim one of the menu items identified by one of the tickets provided in step 60. Accordingly, a user of the one of the client computing devices 14(1)-14(2) can interact with a web page hosted by the predictive ordering server apparatus 12 in order to communicate a request to claim one or more of the menu items identified by one or more of the provided tickets. In order to attribute the request to a specific customer, in some examples, the user of the client computing device 14(1)-14(2) can include customer purchase information with the request, such as indicated in a prior login and/or registration process or in a one time submission. In some examples, the customer can be provided with one or more unique tracking numbers, such as a unique number associated with one or more of the claimed tickets.

In combination or separately, the predictive ordering server apparatus 12 can additionally receive requests for menu items not currently being prepared, along with customizing options for menu items, in order to facilitate customer ordering of customized menu items and/or menu items that were not predicted or included in the preorder information. In some examples, such orders for menu items that were not predicted can be compared to menu items currently in progress and an offer to claim such suggested menu items can be presented to the user of the client computing device 14(1)-14(2) for claiming.

At step 64, the predictive ordering server apparatus 12 provides information regarding the request to the point-of-sale computing device 15 which generates a check associated with the request. The provided information can include an identification of the ticket(s) and/or menu item(s) that were claimed by the user of the client computing device 14(1)-14(2), which the point-of-sale computing device 15 can compare with pricing information stored in memory 40, for example. The provided information can also include at least a subset of the customer purchase information such that the generated check can include information regarding the user of the client computing device 14(1)-14(2) that claimed the menu item(s) identified therein.

Upon receipt of the request, in addition to providing information regarding the request to the point-of-sale computing device 15, at step 66, the predictive ordering server apparatus 12 can change the status of the claimed menu items in the tracking database 22 to indicate that the items are no longer unclaimed. As tickets can be provided, at step 60, to users of one of the client computing devices 14(1)-14(2) at various stages of preparation for the various identified menu items, optionally, the predictive ordering server apparatus 12 provides, at step 60, only those tickets identifying a menu item having an associated unclaimed status in the tracking database 22.

Additionally, in some examples, the predictive ordering server apparatus 12 removes a ticket from the tracking database 22 when a current time is more than a specified time period later than the finished time. Accordingly, those tickets having an associated finished time occurring significantly in the past with respect to the current time the tickets are provided to a client computing device 14(1)-14(2) at step 58, will not be displayed to the user of the client computing device 14(1)-14(2). As the tickets are provided by the predictive ordering server apparatus 12 to the kitchen display module 48 of the point-of-sale computing device 15 at step 58, the associated finish times of the menu items identified therein are available to the restaurant staff which can discard menu items when a specified time period beyond the finished time has passed.

Additionally, in some examples, requests to claim one or more menu items can be cancelled by a user of a client computing device 14(1)-14(2) subsequent to submission of the requests. Such cancellation requests can be obtained by the predictive ordering server apparatus 12 which can communicate with the tracking database 22 to change the status of the menu items identified by the cancellation request to reflect an unclaimed status. Thereby, such cancelled items can be made available for claiming by other users of client computing devices 14(1)-14(2) as described and illustrated earlier.

At step 68, the predictive ordering server apparatus 12 updates the historical purchase information based on the received request. In one example, the predictive ordering server apparatus 12 communicates customer purchase information including the menu item finished time identified by the ticket, the date, and information regarding the claimed menu items, to the point-of-sale computing device 15, which is configured to update the purchase information database 42 accordingly. In another example, information regarding the request is communicated by the predictive ordering server apparatus 12 to the point-of-sale computing device 15 which can generate a check for the requesting customer and update the purchase information database 42 when the purchase is subsequently completed.

As the historical purchase information includes a unique identification of the menu item and the time and day the menu item was claimed, this information can be later retrieved at step 50 and later used to generate preorder information at step 54, as described and illustrated above. Thereby, the historical purchase information can be continually updated and the predictive ordering server apparatus 12 can improve, with respect to prediction and/or preorder information accuracy, over time and based on the additional data.

Accordingly, in one example, a customer can interface with the predictive ordering server apparatus 12 using a mobile phone client computing device 14(1)-14(2) to view all of the tickets currently in progress and having an unclaimed status as well as the time remaining, if any. Using a web browser of the mobile phone client computing device 14(1)-14(2), for example, the customer can submit a request to claim one or more of the menu items, the request including customer purchase information including a mobile phone number which is provided to the point-of-sale system 15. Subsequently, the customer can enter the restaurant, provide the mobile phone number, and obtain the claimed menu items and associated check, as generated by the point-of-sale computing device 15. While the customer can pay the check upon receiving the claimed menu items, in other examples, the customer can interface with a checkout application operating on the predictive ordering server apparatus 12 upon submitting the request to claim the menu items. In another example, a customer can enter the restaurant, be seated at a table having an associated unique table number, and receive a tablet client computing device 14(1)-14(2). Using a dedicated application configured to interface with the predictive ordering server apparatus 12, for example, the customer can view all of the tickets currently in progress and having an unclaimed status as well as the time remaining, if any. The customer can then submit a request to claim one or more of the menu items, the request including customer purchase information including a unique table number. Subsequently, the restaurant staff can serve the customer based on the table number associated with the claimed menu item and/or ticket, as provided to the point-of-sale computing device 15, as well as provide the customer with the associated check, as generated by the point-of-sale computing device 15. The above operations are provided for exemplary purposes only and many other permutations of devices, device interactions, modalities, and operations are possible including in pickup, take-out, delivery, dine-in, and drive-through contexts.

As described herein, this technology predicts menu items that may be ordered by customers in the future based on historical purchase information and, optionally, predictive parameter values. This technology further effectively preorders the menu items such that tickets are prepared at designated begin times. With this technology, restaurant customers can view information regarding menu items currently in progress, including the time remaining until the menu item is ready to be served, and claim one or more of the menu items, thereby reducing customer wait time and increasing both the number of customers that can be serviced and associated revenue.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating predictive preorder information, the method comprising:
   generating, by a predictive computing device, preorder information identifying a plurality of consumer items to be prepared at designated begin times prior to being ordered by a customer, the plurality of consumer items are identified by the preorder information based at least in part on historical purchase information and on one or more predictive parameters modified by an additive or reductive weight value comprising at least an aggressiveness factor, wherein the one or more predictive parameters comprise weather data values obtained from one or more network accessible weather forecast provider devices;
   generating, by the predictive computing device, a ticket identifying a consumer item to be prepared based on the preorder information prior to the consumer item actually being ordered, wherein the consumer item has an associated cooking duration such that the consumer item will be ready at a finished cooking time;
   providing, by the predictive computing device, status information for the generated ticket associated with the consumer item to be displayed on a client computing device, wherein the status information includes at least a remaining amount of time until the consumer item reaches the finished cooking time;
   receiving, by the predictive computing device, a request to claim the consumer item associated with the generated ticket; and
   updating, by the predictive computing device, the historical purchase information based on the request.

2. The method as set forth in claim 1 wherein the request includes customer purchase information, the method further comprising:
   providing, by the predictive computing device, information regarding the request to a point-of-sale device configured to generate a check for the user of the client computing device; and
   periodically retrieving, by the predictive computing device, the historical purchase information from a database.

3. The method as set forth in claim 1 wherein the one or more predictive parameters further comprise time of day, day of week, month, season, restaurant location, weather, promotions, holidays, customer recommendations, or special event.

4. The method as set forth in claim 3 wherein the values for the one or more predictive parameters are obtained, by the predictive computing device, from the point-of-sale device or automatically obtained from an Internet feed.

5. The method as set forth in claim 1 wherein:
   the generating, by the predictive computing device, at each of the designated begin times a ticket further comprises storing the tickets in a database wherein the consumer items identified by each of the tickets are associated in the database with an unclaimed status; and
   the providing, by the predictive computing device, further comprises retrieving from the database only those tickets identifying a consumer item with an unclaimed status.

6. The method as set forth in claim 1 further comprising:
   removing, by the predictive computing device, a ticket from the database when a current time is more than a specified time period later than the finished time; and
   associating, by the predictive computing device, a consumer item with an unclaimed status when a cancellation request is received for a ticket associated with the consumer item.

7. The method as set forth in claim 1 wherein the providing, by the predictive computing device, further comprises selectively sending an automatic notification to one or more customers based on customer profile information stored in a database wherein the customer profile information includes at least one of customer contact information, customer consumer item preference information, or customer notification preference information.

8. The method as set forth in claim 1 wherein the plurality of consumer items comprises menu items, the method further comprising providing, by the predictive computing device, each ticket to a point-of-sale device including a kitchen display module configured to display information regarding each ticket including at least a unique identifier or description of the identified menu item.

9. A non-transitory computer readable medium having stored thereon instructions comprising machine executable code which when executed by a processor of a computing device, causes the processor to perform steps comprising:
  generating preorder information identifying a plurality of consumer items to be prepared at designated begin times prior to being ordered by a customer, the plurality of consumer items are identified by the preorder information based at least in part on historical purchase information and on one or more predictive parameters modified by an additive or reductive weight value, comprising at least an aggressiveness factor, wherein the one or more predictive parameters comprise weather data values obtained from one or more network accessible weather forecast provider devices;
  generating a ticket identifying a consumer item to be prepared based on the preorder information prior to the consumer item actually being ordered, wherein the consumer item has an associated duration such that the consumer item will be ready at a finished cooking time;
  providing status information for the generated ticket associated with the consumer item to be displayed on a client computing device, wherein the status information includes at least a remaining amount of time until the consumer item reaches the finished cooking time;
  receiving a request from a first customer to claim the consumer item associated with the generated ticket;
  updating the historical purchase information based on the request.

10. The medium of claim 9 wherein the request includes customer purchase information, the medium further having stored thereon instructions that when executed by the processor cause the processor to perform steps further comprising:
  providing information regarding the request to a point-of-sale device configured to generate a check for the user of the client computing device; and
  periodically retrieving the historical purchase information from a database stored on a point-of-sale device.

11. The medium of claim 9:
  wherein the one or more predictive parameters further comprise time of day, day of week, month, season, restaurant location, weather, promotions, holidays, customer recommendations, or special events.

12. The medium of claim 11 wherein the one or more predictive parameters are obtained from the point-of-sale device or automatically obtained from an Internet feed.

13. The medium of claim 9 wherein:
  the generating at each of the designated begin times a ticket further comprises storing the tickets in a database wherein the consumer items identified by each of the tickets are associated in the database with an unclaimed status; and
  the providing further comprises providing from the database only those tickets identifying a consumer item with an unclaimed status.

14. The medium of claim 13 further having stored thereon instructions that when executed by the processor cause the processor to perform steps further comprising:
  removing a ticket from the database when a current time is more than a specified time period later than the finished time; and
  associating a consumer item with an unclaimed status when a cancellation request is received for a ticket associated with the consumer item.

15. The medium of claim 9 wherein the providing further comprises selectively sending an automatic notification to one or more customers based on customer profile information stored in a database wherein the customer profile information includes at least one of customer contact information and at least one of, customer consumer item preference information, or customer notification preference information.

16. The medium of claim 9 wherein the plurality of consumer items comprises menu items, the medium further having stored thereon instructions that when executed by the processor cause the processor to perform steps further comprising providing each ticket to a point-of-sale device including a kitchen display module configured to display information regarding each ticket including at least a unique identifier or description of the identified menu item.

17. A predictive computing device, comprising:
  at least one processor;
  a memory coupled to the processor and configured to be capable of executing programmed instructions comprising and stored in the memory to:
  generate preorder information identifying a plurality of consumer items to be prepared at designated begin times prior to being ordered by a customer, the plurality of consumer items are identified by the preorder information based at least in part on historical purchase information and on one or more predictive parameters modified by an additive or reductive weight value, obtained by the processor, comprising at least an aggressiveness factor, wherein the one or more predictive parameters comprise weather data values obtained from one or more network accessible weather forecast provider devices;
  generate a ticket identifying a consumer item to be prepared prior to the consumer item actually being ordered based on the preorder information, wherein the consumer item has an associated duration such that the consumer item will be ready at a finished cooking time;
  provide status information for the generated ticket associated with the consumer item to be displayed on a client computing device, wherein the ticket the status information further includes at least a remaining amount of time until the identified consumer item reaches the finished cooking time;
  receive a request from a first customer to claim the consumer item associated with the generated ticket; and
  update the historical purchase information based on the request.

18. The predictive computing device of claim 17 wherein the request includes customer purchase information and the processor is further configured to execute programmed instructions stored in the memory further comprising:
  providing information regarding the request to a point-of-sale device configured to generate a check for the user of the client computing device; and
  periodically retrieving the historical purchase information from a database stored on a point-of-sale device.

19. The predictive computing device of claim 17 wherein the one or more predictive parameters further comprise time of day, day of week, month, season, restaurant location, weather, promotions, holidays, customer recommendations, or special events.

20. The predictive computing device of claim 19 wherein the one or more predictive parameters are obtained from the point-of-sale device or automatically obtained from an Internet feed.

21. The predictive computing device of claim 17 wherein:
the generating at each of the designated begin times a ticket further comprises storing the tickets in a database wherein the consumer items identified by each of the tickets are associated in the database with an unclaimed status; and
the providing further comprises providing from the database only those tickets identifying a consumer item with an unclaimed status.

22. The predictive computing device of claim 17 wherein the processor is further configured to execute programmed instructions stored in the memory further comprising:
removing a ticket from the database when a current time is more than a specified time period later than the finished time; and
associating a consumer item with an unclaimed status when a cancellation request is received for a ticket associated with the consumer item.

23. The predictive computing device of claim 17 wherein the providing further comprises selectively sending an automatic notification to one or more customers based on customer profile information stored in a database wherein the customer profile information includes at least one of customer contact information, customer consumer item preference information, or customer notification preference information.

24. The predictive computing device of claim 17 wherein:
the plurality of consumer items comprises menu items; and
the processor is further configured to execute programmed instructions stored in the memory further comprising providing each ticket to a point-of-sale device including a kitchen display module configured to display information regarding each ticket including at least a unique identifier or description of the identified menu item.

* * * * *